United States Patent
Haik et al.

(10) Patent No.: US 8,988,733 B2
(45) Date of Patent: Mar. 24, 2015

(54) TO GENERATE AN IMAGE

(71) Applicant: Hewlett-Packard Indigo B.V., Amstelveen (NL)

(72) Inventors: Oren Haik, Nes Ziona (IL); Oded Perry, Nes Ziona (IL); Smadar Shiffman, Palo Alto, CA (US); Liron Itan, Nes Ziona (IL)

(73) Assignee: Hewlett-Packard Indigo B.V., Maastricht (NL)

( * ) Notice: Subject to any disclaimer, the term of this patent is extended or adjusted under 35 U.S.C. 154(b) by 0 days.

(21) Appl. No.: 13/863,741

(22) Filed: Apr. 16, 2013

(65) Prior Publication Data

US 2014/0307275 A1    Oct. 16, 2014

(51) Int. Cl.
*H04N 1/40* (2006.01)
*H04N 1/387* (2006.01)

(52) U.S. Cl.
CPC .................................. *H04N 1/3872* (2013.01)
USPC .......................................... 358/2.1; 358/468

(58) Field of Classification Search
CPC . H04N 7/014; H04N 5/145; H04N 19/00587; H04N 19/00721; H04N 5/144; H04N 19/00151; H04N 19/00781; H04N 19/00909; G06T 2207/10016; G06T 7/20; G06T 7/2013; G06T 7/2033; G06K 9/481; G06K 9/00201; G06K 9/4671; G06K 9/00604; G06K 9/0061
USPC ............ 358/1.9, 2.1, 468, 448; 382/103, 107, 382/190–191, 197, 195, 206, 260
See application file for complete search history.

(56) References Cited

U.S. PATENT DOCUMENTS

| | | | | |
|---|---|---|---|---|
| 4,809,067 | A  * | 2/1989  | Kikuchi et al. | 375/240.12 |
| 5,157,732 | A  * | 10/1992 | Ishii et al. | 382/107 |
| 5,194,950 | A  * | 3/1993  | Murakami et al. | 375/240.16 |
| 6,687,405 | B1 * | 2/2004  | Trew et al. | 382/232 |
| 2011/0194607 | A1 | 8/2011 | Luo et al. | |
| 2012/0274997 | A1 | 11/2012 | Skinner et al. | |
| 2012/0281244 | A1 | 11/2012 | Guarnera et al. | |

OTHER PUBLICATIONS

Yang, S. et al., "A Novel Method Based on Color Information for Scanned Data Alignment", Oct. 27-29, 2008, pp. 201-204.

* cited by examiner

*Primary Examiner* — Thomas D Lee
*Assistant Examiner* — Stephen M Brinich

(57) ABSTRACT

A method to generate an image in which a plurality of offset vectors for portions of a first image are determined by comparing the similarity of the portions to portion of a second image.

20 Claims, 8 Drawing Sheets

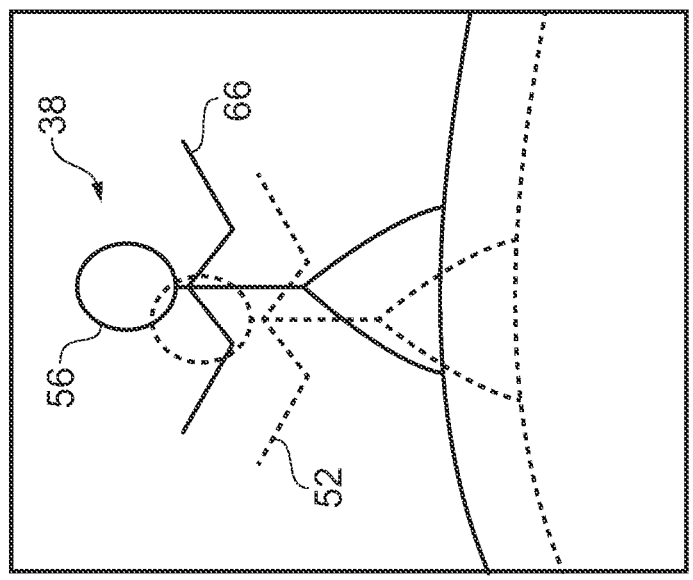
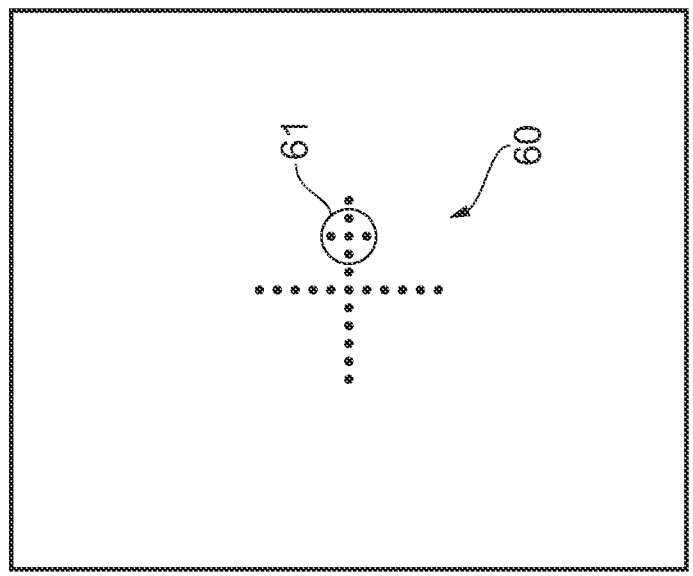
FIG. 6
FIG. 5

| $70_1$ | $70_4$ | $70_7$ | $70_{10}$ | $70_{13}$ |
|---|---|---|---|---|
| 5 | 5 | 5 | 4 | 6 |
| $70_2$ | $70_5$ | $70_8$ | $70_{11}$ | $70_{14}$ |
| 5 | 20 | 5 | 3 | 8 |
| $70_3$ | $70_6$ | $70_9$ | $70_{12}$ | $70_{15}$ |
| 5 | 5 | 5 | 2 | 6 |

FIG. 10

| $70_1$ | $70_4$ | $70_7$ | $70_{10}$ | $70_{13}$ |
|---|---|---|---|---|
| 5 | 5 | 5 | 4 | 6 |
| $70_2$ | $70_5$ | $70_8$ | $70_{11}$ | $70_{14}$ |
| 5 | 5 | 5 | 3 | 8 |
| $70_3$ | $70_6$ | $70_9$ | $70_{12}$ | $70_{15}$ |
| 5 | 5 | 5 | 2 | 6 |

FIG. 11

TO GENERATE AN IMAGE

BACKGROUND

Printer apparatus are usually arranged to print an image onto media. For example, a printer apparatus may obtain an image file and control a print engine to print the image onto a sheet or roll of media. An image may include text and/or graphics. The image printed on the media may include print defects that result in the printed image having a different appearance to the image file.

BRIEF DESCRIPTION

Reference will now be made by way of example only to the accompanying drawings in which:

FIG. 5 illustrates a rood pattern according to an example;

FIG. 6 illustrates a first image according to an example;

FIG. 10 illustrates a matrix of offset vectors for the portions of the first image in a first dimension according to an example;

FIG. 11 illustrates a matrix of offset vectors for the portions of the first image in a second dimension according to an example.

DETAILED DESCRIPTION

Figure 1:
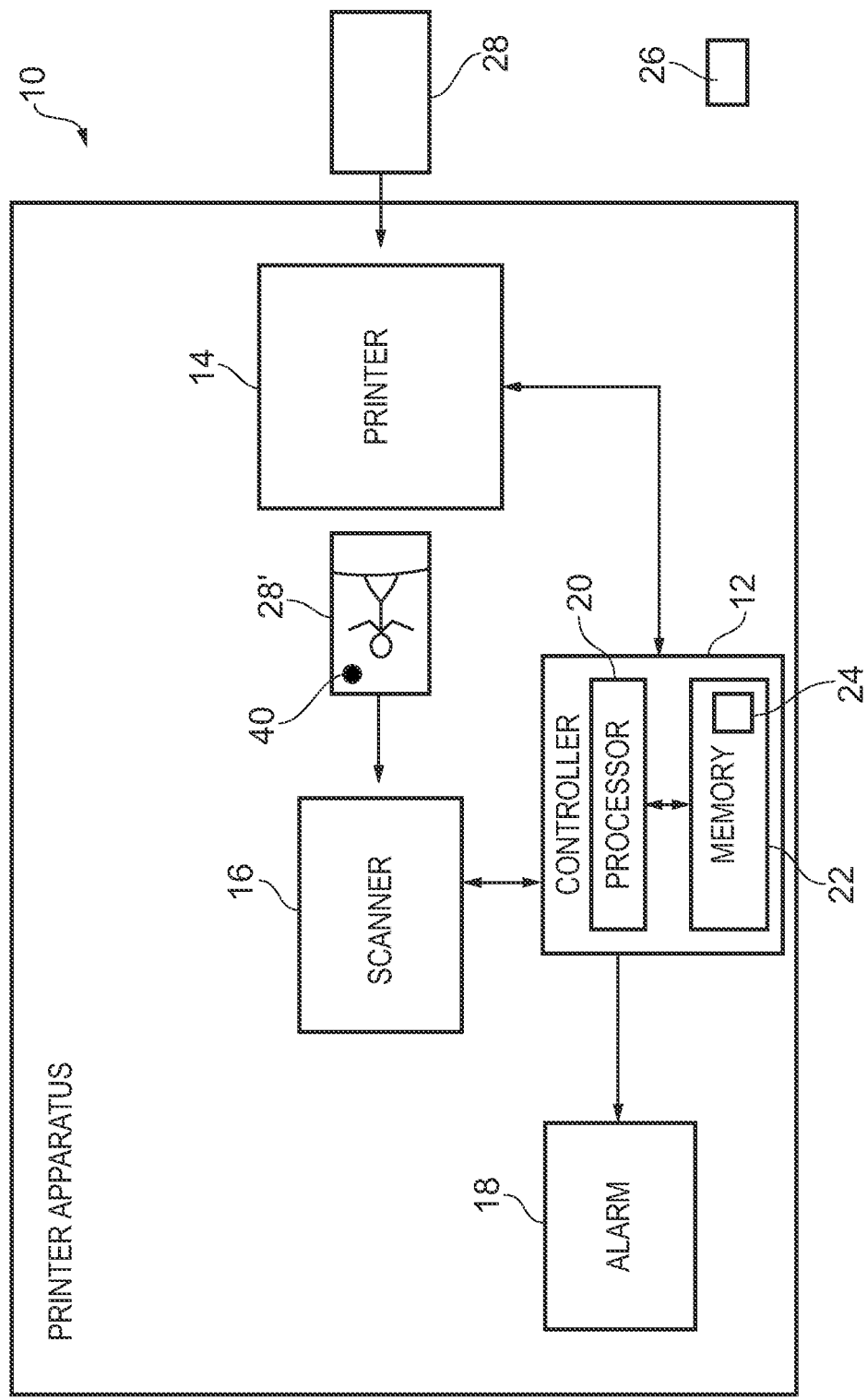
FIG. 1 illustrates a schematic diagram of apparatus according to an example.

FIG. 1 illustrates a schematic diagram of apparatus 10 (which may also be referred to as printer apparatus 10) including a controller 12, a printer 14, a scanner 16 and an alarm 18. The printer apparatus 10 may include a single housing for housing the controller 12, the printer 14, the scanner 16 and the alarm 18 therein. In other examples, the controller 12, and/or the printer 14 and/or the scanner 16 and/or the alarm 18 may have separate housings.

The printer apparatus 10 may be a module in some examples. As used here, 'module' refers to a unit or apparatus that excludes certain parts/components that would be added by an end manufacturer or a user. For example, where the printer apparatus 10 is a module, the printer apparatus 10 may only include the controller 12 (the printer 14, the scanner 16 and the alarm 18 are added by an end manufacturer).

The implementation of the controller 12 can be in hardware alone (for example, a circuit, a processor and so on), have certain aspects in software including firmware alone or can be a combination of hardware and software (including firmware).

The controller 12 may be implemented using instructions that enable hardware functionality, for example, by using executable computer program instructions in a general-purpose or special-purpose processor 20 that may be stored on a computer readable storage medium 22 (disk, memory and so on) to be executed by such a processor 20.

The processor 20 is configured to read from and write to the memory 22. The processor 20 may also comprise an output interface via which data and/or commands are output by the processor 20 and an input interface via which data and/or commands are input to the processor 20.

The memory 22 stores a computer program 24 comprising computer program instructions that control the operation of the printer apparatus 10 when loaded into the processor 20. The computer program instructions 24 provide the logic and routines that enables the printer apparatus 10 to perform the method illustrated in FIG. 2. The processor 20 by reading the memory 22 is able to load and execute the computer program 24.

The apparatus 10 therefore comprises: at least one processor 20; and at least one memory 22 including computer program code 24, the at least one memory 22 and the computer program code 24 configured to, with the at least one processor 20, cause the apparatus 10 at least to perform: determining a plurality of offset vectors for portions of a first image by comparing the similarity of the portions to portions of a second image; determining the validity of a first offset vector of the plurality of offset vectors by comparing the first offset vector with other offset vectors of the plurality of offset vectors; changing the first offset vector where the first offset vector is determined as invalid; and generating an image by applying the plurality of offset vectors to the portions of the first image.

The computer program 24 may arrive at the printer apparatus 10 via any suitable delivery mechanism 26. The delivery mechanism 26 may be, for example, a non-transitory computer-readable storage medium, a computer program product, a memory device, a record medium such as a compact disc read-only memory (CD-ROM) or digital versatile disc (DVD), an article of manufacture that tangibly embodies the computer program 24. The delivery mechanism 26 may be a signal configured to reliably transfer the computer program 24. The printer apparatus 10 may propagate or transmit the computer program 24 as a computer data signal.

Although the memory 22 is illustrated as a single component it may be implemented as one or more separate components some or all of which may be integrated/removable and/or may provide permanent/semi-permanent/dynamic/cached storage.

References to 'computer-readable storage medium', 'computer program product', 'tangibly embodied computer program' etc. or a 'controller', 'computer', 'processor' etc. should be understood to encompass not only computers having different architectures such as single/multi-processor architectures and sequential (Von Neumann)/parallel architectures but also specialized circuits such as field-programmable gate arrays (FPGA), application specific circuits (ASIC), signal processing devices and other processing circuitry. References to computer program, instructions, code etc. should be understood to encompass software for a programmable processor or firmware such as, for example, the programmable content of a hardware device whether instructions for a processor, or configuration settings for a fixed-function device, gate array or programmable logic device and so on.

As used in this application, the term 'circuitry' refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus to perform various functions) and
(c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware.

The printer 14 may be any suitable printer for printing an image (including text and/or graphics for example) on a sheet or web of media 28 and may be, for example, an inkjet printer, a dry toner printer, a solid ink printer, or a liquid ink printer. Under the control of the controller 12, the printer 14 is arranged to receive a sheet or web of media 28 (such as paper), print an image on the media 28 using a reference image, and then provide the printed media 28' to the scanner 16.

The scanner 16 may be any suitable image scanner for scanning the printed media 28'. For example, the scanner 16 may include a charged coupled device (CCD) or a contact image sensor (CIS). The controller 12 is arranged to control the scanner 16 to scan the printed media 28', and is also arranged to receive a scanned image of the printed media 28' from the scanner 16.

The alarm 18 may be any suitable device for alerting a user of the printer apparatus 10 that the printed media 28' includes at least one detected printing defect. For example, the alarm 18 may include a display for notifying a user that the printed media 28' has been determined to include a printing defect and may show the printing defect on the display. By way of another example, the alarm 18 may additionally or alternatively include an audio output device that produces acoustic waves to notify a user that the printed media 28' includes a detected printing defect. The controller 12 is arranged to control the alarm 18 to alert the user to the detected printing defect.

The operation of the printer apparatus 10 is described in the following paragraphs with reference to FIG. 2.

At block 30, the controller 12 controls the printer 14 to print a reference image on the media 28. The printer 14 prints on the media 28 under the control of the controller 12 and subsequently provides printed media 28' having the reference image printed thereon.

Figure 3:
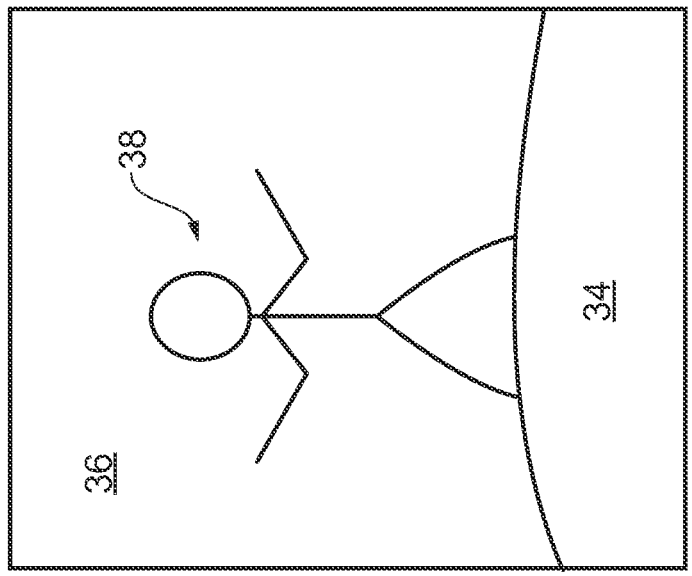
FIG. 3 illustrates a reference image according to an example.

FIG. 3 illustrates a reference image 32 according to an example. The reference image 32 includes a ground section 34 in the lower third of the image, a sky section 36 in the upper two thirds of the image, and a person 38 stood on the ground section 34 in the middle of the image.

As illustrated in FIG. 1, the printed media 28' includes the reference image 32 printed thereon. However, the printed media 28' also includes a printing defect 40 (caused by the printer 14) in the sky section 36 of the printed media 28'. It should be appreciated that the printing defect 40 does not form part of the reference image 32 and therefore causes the image on the printed media 28' to have a different appearance to the reference image 32.

At block 42, the controller 12 controls the scanner 16 to scan the printed media 28' and receives a scanned image of the printed media 28' from the scanner 16. The scanned image may include at least one scanning defect caused by the scanner 16 that results in the scanned image having a different appearance to the reference image 32 and to the image on the printed media 28'. For example, the at least one scanning defect may result in the scanned image being different to the reference image in terms of rotation, color, blur and resolution. Furthermore, the differences may not be uniform throughout the scanned image.

Figure 4:
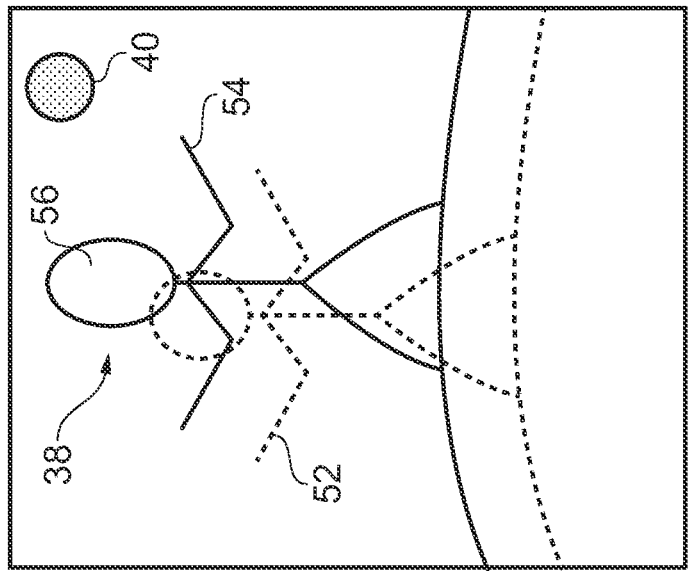
FIG. 4 illustrates a scanned image according to an example.

FIG. 4 illustrates a scanned image 44 according to an example and a Cartesian coordinate axis 46 that includes an X axis 48 and a Y axis 50 that are orthogonal relative to one another. The scanned image 44 is similar to the reference image 32, but differs in that the scanned image 44 includes the scanning defect of being shifted in the +X direction and in the +Y direction so that the person 38 has been shifted from position 52 in the reference image 32 (represented by the dotted lines in FIG. 4) to position 54 (i.e. the person has been moved up and right in the scanned image 44). Additionally, the scanned image 44 includes the scanning defect of the head 56 of the person 38 being elongated in the Y direction.

At block 58, the controller 12 determines an offset vector for the reference image 32 by comparing the similarity of the reference image 32 to the scanned image 44. In particular, the controller 12 calculates a similarity parameter (such as the Sum of Absolute Difference (SAD) or the Root Mean Square (RMS)) for a plurality of positions of the reference image 32 relative to the scanned image 44. The controller 12 then selects the position where the reference image 32 has greatest similarity to the scanned image 44 (i.e. the similarity parameter has a value which indicates greatest similarity between the reference image 32 and the scanned image 44). Subsequently, the controller 12 determines the offset vector (which may also be referred to as a motion vector) between the reference image 32 and the scanned image 44. The offset vector indicates the size and direction of the shift between the reference image 32 and the scanned image 44 and may comprise an X value (indicating the shift in the X axis 48) and a Y value (indicating the shift in the Y axis 50).

For example, at block 58 the controller 12 may move the reference image 32 relative to the scanned image 44 through the positions 60 illustrated in FIG. 5. The positions 60 are arranged in a rood pattern having a central position (at coordinate X=0, Y=0) that is positioned at the center of the scanned image 44, five positions extending in the +X direction from the central position, five positions extending in the −X direction from the central position, five positions extending in the +Y direction from the central position, and five positions extending in the −Y direction from the central position. In other examples, the controller 12 may move the reference image 32 relative to the scanned image 44 through any number of positions (for example, a rood pattern having forty five positions in the X axis 48 and forty five positions in the Y axis 50) that are arranged in any predetermined shape.

In more detail, the controller 12 moves the reference image 32 so that the central point of the reference image 32 overlays the position 60 having the coordinate X=−5, Y=0 and calculates the sum of absolute differences between the pixels of the reference image 32 and the pixels of the scanned image 44. The controller 12 then moves the reference image 32 so that the central point of the reference image 32 moves through the positions between X=−5, Y=0 and X=5, Y=0 and calculates the sum of absolute differences between the reference image 32 and the scanned image 44 for each of the positions. The result of this process is eleven sum of absolute difference values for the eleven positions between X=−5, Y=0 and X=5, Y=0.

The controller 12 then moves the reference image 32 so that the central point of the reference image 32 overlays the position 60 having the coordinate X=0, Y=−5 and calculates the sum of absolute differences between the pixels of the reference image 32 and the pixels of the scanned image 44. The controller 12 then moves the reference image 32 so that the central point of the reference image 32 moves through the positions between X=0, Y=−5 and X=0, Y=5 and calculates the sum of absolute differences between the reference image 32 and the scanned image 44 for each of the positions. The result of this process is eleven sum of absolute difference values for the eleven positions between X=0, Y=−5 and X=0, Y=5.

The controller 12 then selects the position having the lowest sum of absolute difference value. For example, the position having the lowest of absolute difference value may be X=3, Y=0. Subsequently, the controller 12 then moves the reference image 32 about a second rood pattern (indicated by the circle having the reference numeral 61) around the previously selected position (i.e. X=3, Y=0) and calculates the sum of absolute differences between the reference image 32 and the scanned image 44 at those positions. For example, where the selected position is X=3, Y=0, the controller moves the reference image 32 about a rood pattern having the coordinates: X=4, Y=0, X=2, Y=0, X=3, Y=1, X=3, Y=−1. The controller 12 then selects the position from the second rood pattern having the lowest sum of absolute difference value. This process is repeated until a position is found having the lowest sum of absolute difference value.

In some examples, every sum of absolute difference value that is the result of a higher search radius (for example, X=5, Y=0 has a greater search radius than X=4, Y=0), may be increased by a factor to reduce the likelihood of that position being selected (that is, higher non logical search values are 'punished').

In some examples, the controller 12 may perform a 'zero motion check' by first calculating a similarity parameter for the central position of the reference image 32 relative to the scanned image 44 (that is, the position indicative of no offset between the reference image 32 and the scanned image 44). If the similarity parameter indicates that there is sufficient similarity between the reference image 32 and the scanned image 44 (for example, the sum of absolute differences is below a predetermined threshold value), the controller 12 selects the central position and determines that the offset vector is zero.

The controller 12 determines the offset vector between the reference image 32 and the scanned image 44 using the coordinates of the selected position. For example, if the selected position has the coordinates X=3, Y=5 and the positions 60 relate to adjacent pixels, the controller 12 determines the offset vector as (3, 5).

At block 62, the controller 12 generates a first image by applying the offset vector determined in block 58 to the reference image 32. For example, where the offset vector determined in block 58 is (3, 5), the controller 12 shifts the position of all the pixels in the reference image 32 by three pixels in the +X direction, and by five pixels in the +Y direction.

FIG. 6 illustrates a first image 64 according to an example. The first image 64 is similar to the reference image 32, but differs in that the first image 64 has been shifted by the offset vector in the +X direction and in the +Y direction so that the person 38 has been shifted from position 52 in the reference image 32 (represented by the dotted lines in FIG. 4) to position 66 (i.e. the person has been moved up and right in the first image 64 relative to the reference image 32). However, it should be noted that the head 56 of the person 38 is similar to the head of the person in the reference image 32 and is not elongated as in the scanned image 44.

Blocks 58 and 62 may be referred to as a "global block match" and the offset vector determined in block 58 may be referred to as a "global offset vector" or a "global motion vector".

At block 68, the controller 12 determines a plurality of offset vectors for portions of the first image 64 by comparing the similarity of the portions to the scanned image 44.

Figure 7:
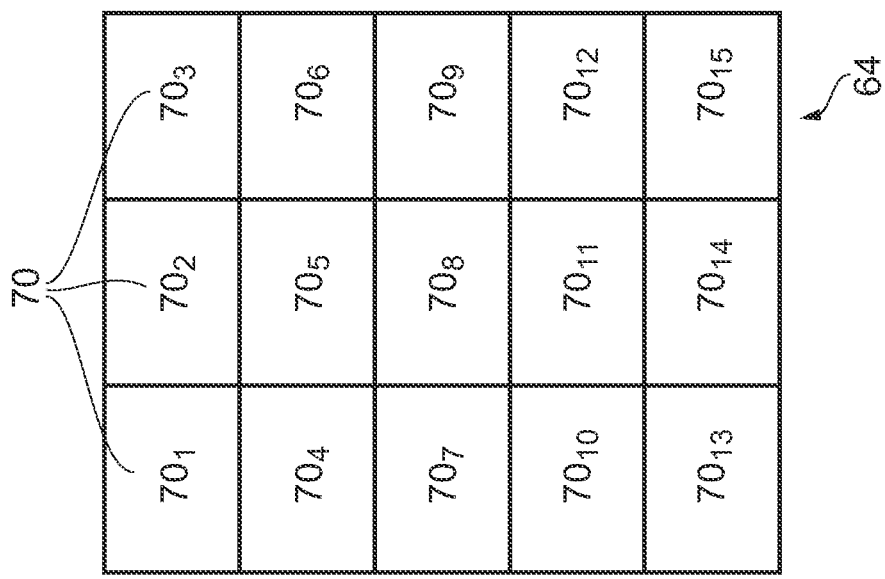
FIG. 7 illustrates partitioning of the first image according to an example.

Initially, the controller 12 partitions the first image 64 into a plurality of portions. For example, FIG. 7 illustrates a first image 64 (the graphics of the image have been omitted to maintain the clarity of the Fig.) that has been partitioned by the controller 12 into fifteen equally sized rectangular portions 70 so that the first image 64 has three columns of portions and five rows of portions. The portions 70 are given the reference numerals $70_1$, $70_2$, $70_3$ and so on through to $70_{15}$. In other examples, there may be any number of portions arranged in any number of columns and rows. Furthermore, the portions may have any suitable shape (for example, the portions may be square instead of rectangular) or combination of shapes.

The controller 12 then determines an offset vector of a portion 70 of the first image 64 by calculating a similarity parameter for a plurality of positions of that portion 70 of the first image 64 relative to the scanned image 44 and then selecting the position where the portion 70 of the first image 64 has the greatest similarity to a portion of the scanned image 44. The controller 12 repeats this process for each of the portions 70 of the first image 64. The controller 12 determines the offset vector between each portion 70 of the first image 64 and a portion of the scanned image 44. The offset vector indicates the size and direction of the shift between each portion 70 of the first image 64 and the scanned image 44 and may comprise an X value and a Y value.

Figure 8:
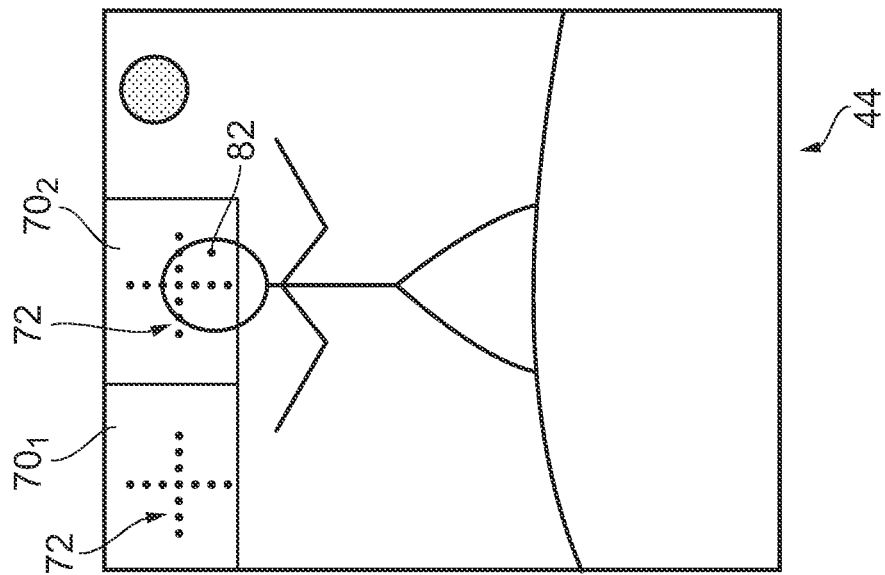
FIG. 8 illustrates how the partitioned portions of the first image are compared with the scanned image according to an example.

For example, at block 68 the controller 12 may move a first portion $70_1$ of the first image 64 relative to the scanned image 44 through the positions 72 illustrated in FIG. 8. The positions 72 are arranged in a rood pattern having a central position (at coordinate X=0, Y=0) that is positioned at the center of a corresponding portion of the scanned image 44, three positions extending in the +X direction from the central position, three positions extending in the −X direction from the central position, three positions extending in the +Y direction from the central position, and three positions extending in the −Y direction from the central position. In other examples, the controller 12 may move the first portion $70_1$ of the first image 64 relative to the scanned image 44 through any number of positions (for example, a rood pattern having forty one positions in the X axis 48 and forty one positions in the Y axis 50) that are arranged in any predetermined shape.

In more detail, the controller 12 moves the first portion $70_1$ of the first image 64 so that the central point of the first portion $70_1$ overlays the position 72 having the coordinate X=−3, Y=0 and calculates the sum of absolute differences between the pixels of the first portion $70_1$ and the pixels of the scanned image 44. The controller 12 then moves the first portion $70_1$ so that the central point of the first portion $70_1$ moves through the positions between X=−3, Y=0 and X=3, Y=0 and calculates the sum of absolute differences between the first portion $70_1$ and the scanned image 44 for each of the positions. The result of this process is seven sum of absolute difference values for the seven positions between X=−3, Y=0 and X=3, Y=0.

The controller 12 then moves the first portion $70_1$ so that the central point of the first portion $70_1$ overlays the position 72 having the coordinate X=0, Y=−3 and calculates the sum of absolute differences between the pixels of the first portion $70_1$ and the pixels of the scanned image 44. The controller 12 then moves the first portion $70_1$ so that the central point of the first portion $70_1$ moves through the positions between X=0, Y=−3 and X=0, Y=3 and calculates the sum of absolute differences between the first portion $70_1$ and the scanned image 44 for each of the positions. The result of this process is seven sum of absolute difference values for the seven positions between X=0, Y=−3 and X=0, Y=3.

The controller 12 then selects the position having the lowest sum of absolute difference value. For example, the position having the lowest of absolute difference value may be X=0, Y=2. Subsequently, the controller 12 then moves the first portion $70_1$ about a second rood pattern around the previously selected position (i.e. X=0, Y=2) and calculates the sum of absolute differences between the first portion $70_1$ and the scanned image 44 at those positions. The controller 12 then selects the position from the second rood pattern having the lowest sum of absolute difference value. This process is repeated until a position is found having the lowest sum of absolute difference value.

In some examples, the controller 12 may select the position 72 with the lowest sum of absolute difference by plotting a graph of the sum of absolute difference versus position of the portion $70_1$ of the first image 64. Subsequently, the controller 12 selects the position 72 on the graph where the first portion $70_1$ of the first image 64 has the greatest curvature (that is, the highest gradient) and lowest sum of absolute difference (that is, the position 72 where the first portion $70_1$ has the greatest similarity to the second image 44).

Where the pattern of positions 72 is two dimensional (a rood pattern for example), the controller 12 may plot a first graph for positions along the X axis, and a second graph for positions along the Y axis. The controller 12 selects a position by first determining the positions in the first and second graphs that have the lowest sum of absolute difference values. The controller 12 then calculates the curvatures of the first and second graphs around those selected positions. Where the curvature of the second graph is below a threshold value (indicating that the position is not a real local minimum), the position on the first graph is selected (even where the position on the second graph may have a lower sum of absolute difference value).

Where the controller 12 calculates a similarity parameter that is different to the sum of absolute differences (such as the root mean square for example), the graph will be of that similarity parameter versus position.

Figure 9A:
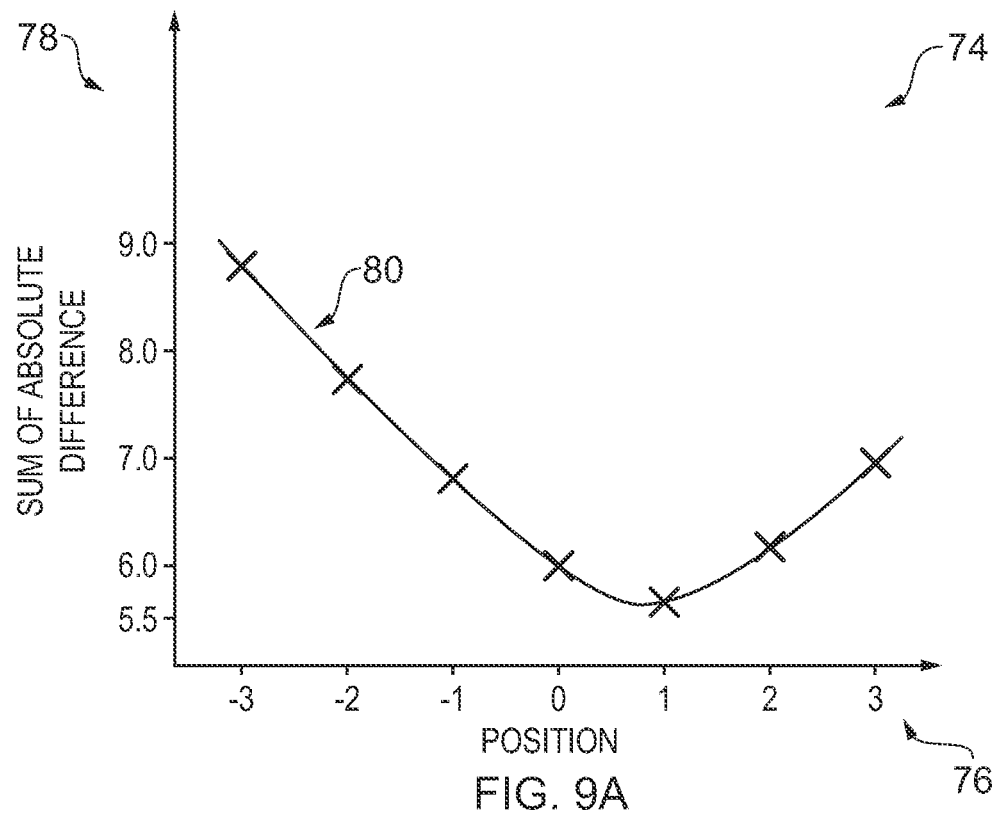
FIG. 9A illustrates a graph of sum of absolute difference versus position along a first dimension for a portion of the first image compared with the scanned image according to an example.

For example, FIG. 9A illustrates a graph 74 of sum of absolute difference versus position along a first dimension (such as the X axis). The graph 74 includes a horizontal axis 76 for position and a vertical axis 78 for the sum of absolute differences. The graph 74 also includes a line 80 which represents how the sum of absolute differences varies with position. The line 80 has a minimum at the position of 1 with a sum of absolute difference of 5.5.

Figure 9B:
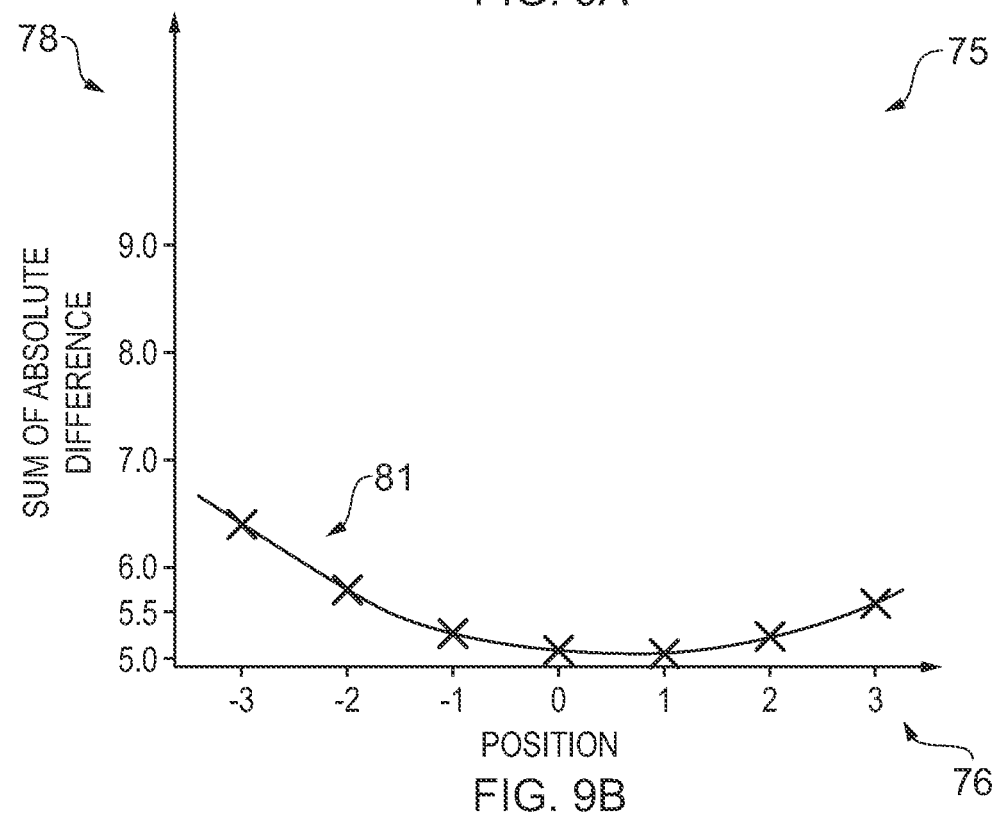
FIG. 9B illustrates a graph of sum of absolute difference versus position along a second dimension for a portion of the first image compared with the scanned image according to an example.

FIG. 9B illustrates a graph 75 of sum of absolute difference versus position along a second dimension (such as the Y axis). The graph 75 includes a horizontal axis 76 for position and a vertical axis 78 for the sum of absolute differences. The graph 75 also includes a line 81 which represents how the sum of absolute differences varies with position. The line 81 has a minimum at the position of 1 with a sum of absolute difference of 5.0.

When the controller 12 analyses the graphs 74 and 75, the controller 12 selects the positions 1 in the graphs 74 and 75 since they have the lowest sum of absolute differences. The controller 12 then calculates the curvatures of the graphs 74, 75 around the selected positions. In this example, the second graph 75 is below a threshold value (indicating that the position is not a real local minimum), and consequently, the position 1 on the graph 74 is selected (even though the position 1 on the graph 75 has a lower sum of absolute difference).

The controller 12 determines the offset vector between the first portion $70_1$ and the scanned image 44 using the coordinates of the selected position.

Subsequently, the controller 12 determines the offset vector for a second portion $70_2$ according to a similar process to that performed for portion $70_1$. The process for determining the offset vector for the second portion $70_2$ differs from the process for determining the offset vector for the first portion $70_1$ in that subsequent to the similarity parameter being calculated for the positions 72 in the first rood pattern, but prior to the calculation of the similarity parameter for the second rood pattern, the controller 12 moves the second portion $70_2$ so that the central point of the second portion $70_2$ overlays the position 82 and calculates the sum of absolute differences between the pixels of the second portion $70_2$ and the pixels of the scanned image 44.

The position 82 corresponds to the offset vector for the adjacent portion on the left hand side of the portion $70_2$ (that is, the position 82 corresponds to the offset vector for the first portion $70_1$). In other examples, the position 82 may correspond to the offset vector from any adjacent portion of the portion being processed. The position 82 may not form part of the predetermined pattern of the positions 72 (i.e. the position 82 is not a part of the rood pattern of the positions 72).

The controller 12 then compares the sum of absolute differences of the position 82 and of the positions 72 of the first rood pattern. The controller 12 selects the position having the greatest similarity to the scanned image 44 and then proceeds to calculate a similarity parameter for a second rood pattern centered on the selected position.

In some examples, the controller 12 may initially perform in block 68 a zero motion check as described above for the plurality of portions 70 of the first image 64.

Blocks 68 may be referred to as a "local block match" and the offset vectors determined in block 68 may be referred to as "local offset vectors" or "local motion vectors".

The result of block 68 is a plurality of offset vectors for the portions 70 of the first image 64. The plurality of offset vectors may be arranged into a first matrix for shifting the first image 64 in the X axis, and a second matrix for shifting the first image 64 in the Y axis.

FIG. 10 illustrates a matrix of offset vectors for the portions 70 of the first image 64 in the X axis according to an example. The portions $70_1$, $70_2$, $70_3$, $70_4$, $70_6$, $70_7$, $70_8$, and $70_9$ have a value of +5. The portions $70_{13}$ and $70_{15}$ have a value of +6. The portion $70_5$ has a value of +20, the portion $70_{10}$ has a value of +4, the portion $70_{11}$ has a value of +3, the portion $70_{12}$ has a value of +2, and the portion $70_{14}$ has a value of +8.

FIG. 11 illustrates a matrix of offset vectors for the portions 70 of the first image 64 in the Y axis according to an example. The portions $70_1$, $70_2$, $70_3$, $70_4$, $70_5$, $70_6$, $70_7$, $70_8$, and $70_9$ have a value of +5. The portions $70_{13}$ and $70_{15}$ have a value of 6. The portion $70_{11}$ has a value of 3, the portion $70_{12}$ has a value of 2, and the portion $70_{14}$ has a value of 8.

At block 84, the controller 12 determines the validity of a first offset vector of the plurality of offset vectors by comparing the first offset vector with other offset vectors of the plurality of offset vectors. For example, the controller 12 may determine whether the first offset vector lies within a predetermined range of offset vectors in order to determine the validity of the first offset vector.

At block 86, the controller 12 changes the first offset vector where the first offset vector is determined to be invalid. For example, the controller 12 may change the first offset vector to have the same value as: an offset vector from an adjacent portion; the median offset vector of adjacent portions; or the mean offset vector of adjacent portions.

Blocks 84 and 86 are then repeated for at least some (and in some examples all) of the other offset vectors of the plurality of offset vectors so that the validity of those other offset vectors is checked, and changed if they are determined to be invalid.

According to a first method for blocks 84 and 86, the predetermined range of offset vectors is determined from the offset vectors of portions 70 adjacent to the portion associated with the first offset vector. In order to determine the validity of the offset vector of the portion $70_5$ (which is X=+20) for example, the controller 12 may determine a range of offset vectors using the adjacent portions, namely portions $70_1$, $70_2$, $70_3$, $70_4$, $70_6$, $70_7$, $70_8$, and $70_9$ (more or less portions could be used in other examples). The controller 12 may first determine the mean or median offset vector for the portions $70_1$, $70_2$, $70_3$, $70_4$, $70_6$, $70_7$, $70_8$, and $70_9$ and then determine the range of valid values around the mean or median. The range of valid values may be predetermined (for example, the valid values may be + or −3) or may be a value associated with the adjacent offset vectors (for example, the range may be one standard deviation of the adjacent offset vectors).

If the offset vector of the portion $70_5$ falls within the range, the offset vector of the portion $70_5$ is determined to be valid. If the offset vector of the portion $70_5$ falls outside of the range, the offset vector of the portion $70_5$ is determined to be invalid.

If the first offset vector is determined to be invalid, the controller 12 calculates a similarity parameter (such as sum of absolute differences) for the portion associated with the first offset vector (hereinafter referred to as the 'first portion') and the associated portion of the scanned image 44. The controller 12 also calculates a similarity parameter for portions adjacent to the first portion. The controller 12 then compares the similarity parameter of the first portion with the similarity parameter of the adjacent portions and if they are within a predetermined range of each other, the first offset vector is determined to be invalid (since the first portion differs from the associated portion of the scanned image 44 to a similar extent as the adjacent portions). If the similarity parameter of the first portion is outside of the predetermined range, the first offset vector is determined to be valid.

Where the first offset vector is determined to be invalid, the controller 12 changes the first offset vector. As described above, the first offset vector may be changed to have (for example) the same value as: an offset vector from an adjacent portion; the median offset vector of adjacent portions; or the mean offset vector of adjacent portions.

According to a second method for blocks 84 and 86, the controller 12 analyses the X axis matrix of offset vectors to determine whether there is correlation between offset vectors in the X axis. The controller 12 also analyses the Y axis matrix of offset vectors to determine whether there is correlation between offset vectors in the Y axis. For example, the offset vectors in the columns of the X axis matrix (illustrated in FIG. 10) should be similar to one another (within a range), and the offset vectors in the rows of the Y axis matrix (illustrated in FIG. 11) should be similar to one another (within a range).

Where an offset vector falls outside of a range, the controller 12 replaces the offset vector with the row or column median or mean.

In some examples, the controller 12 may only perform the first method described above. In other examples, the controller 12 may only perform the second method described above. In further examples, the controller 12 may perform the first method and then the second method. In still further examples, the controller 12 may perform the second method and then the first method.

Blocks 84 and 86 may be referred to as "post processing" and "outlier analysis and adjustment".

Figure 12:
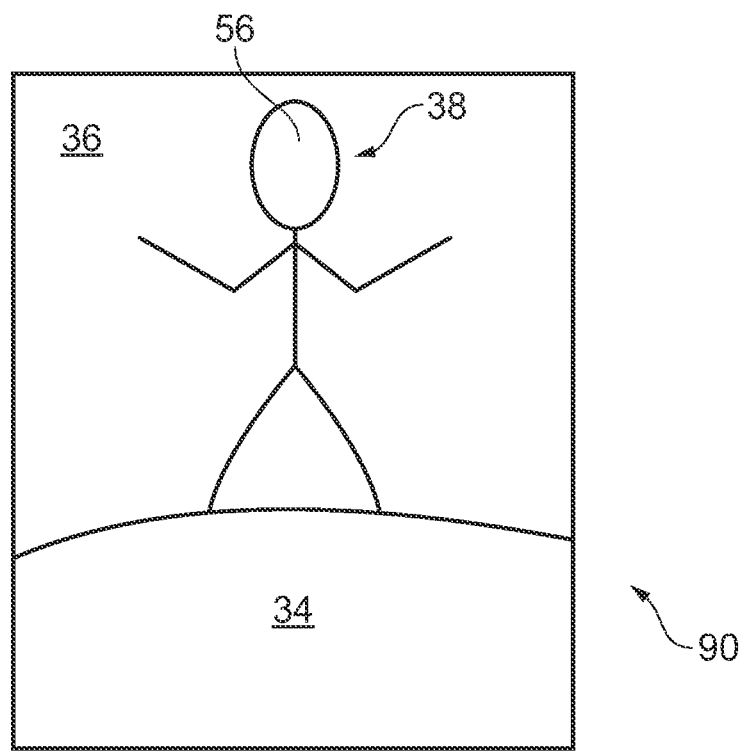
FIG. 12 illustrates a generated image according to an example.

At block 88, the controller 12 generates an image by applying the plurality of offset vectors (adjusted at block 86 where necessary) to the portions 70 of the first image 64. The application of the plurality of offset vectors applies individual mapping to the portions 70 of the first image 64 so that they more closely resemble the scanned image 44. Consequently, the generated image may also be referred to as a 'generated mapped image'. For example, FIG. 12 illustrates a generated image 90 that is the result of applying a plurality of offset vectors to the first image 64. It can be seen that the generated image 90 more closely resembles the scanned image 44 than the reference image 32 or the first image 64 since the image has been shifted upwards and to the right. Furthermore, the local block matching of block 68 has resulted in the head 56 of the person 38 being elongated as in the scanned image 44.

At block 92, the controller 12 identifies printing defects in the scanned image 44 by comparing the similarity of the scanned image 44 with the generated image 90. Where the controller 12 identifies a printing defect (such as defect 40), the controller 12 controls the alarm to notify a user that a printing defect has been detected.

The printer apparatus 10 provides an advantage in that the generated image 90 more closely resembles the scanned image 44. Furthermore, the post processing blocks 84, 86 check the validity of the offset vectors for the portions 70 and replace them where they are invalid. The printer apparatus 10 may consequently result in the issuance of fewer false alarms of printing defects. Additionally, the method illustrated in FIG. 2 may require relatively low processing power and the printer apparatus 10 may be able to detect printing defects at a relatively high throughput of media 28.

Figure 2:
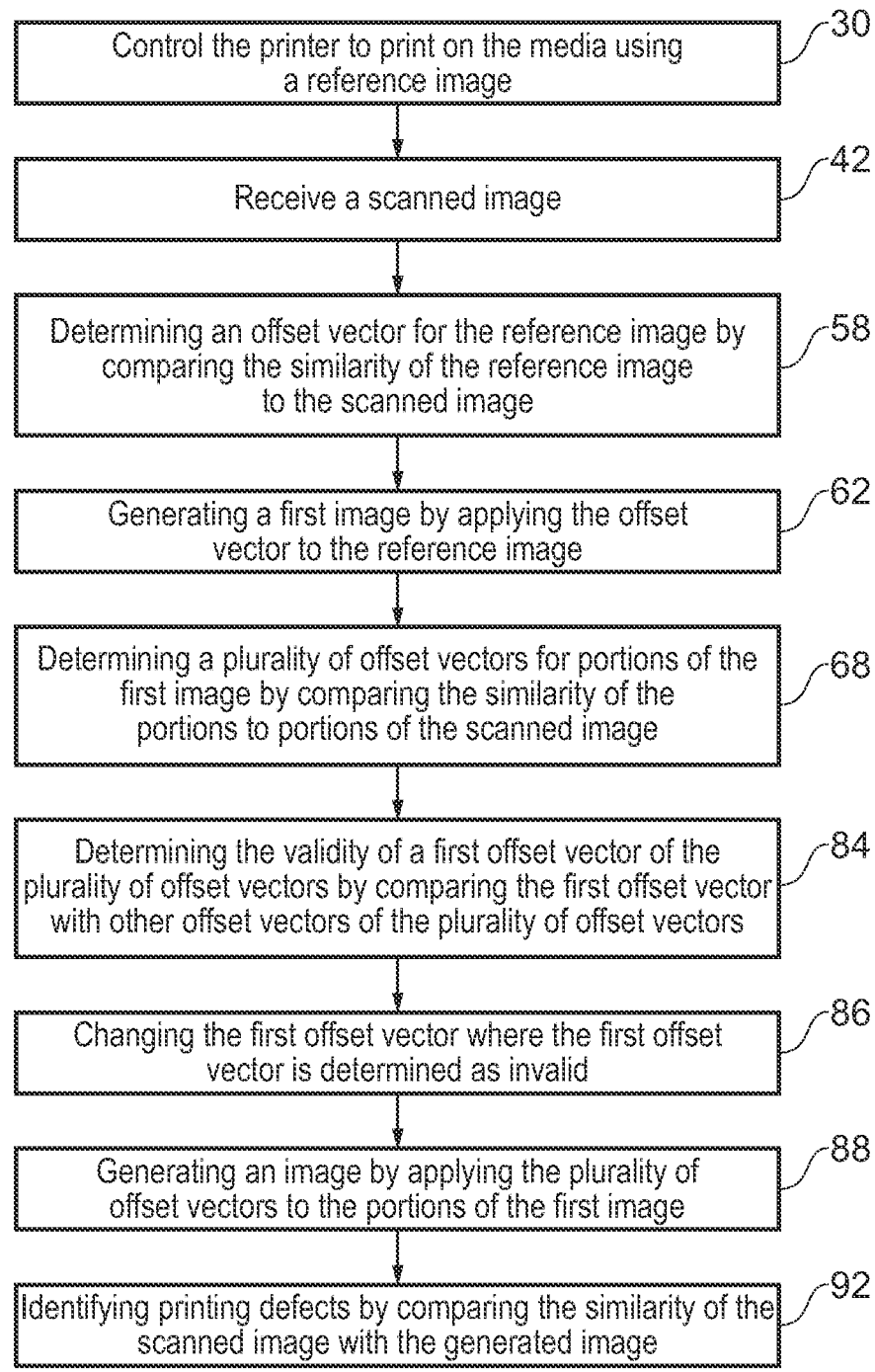
FIG. 2 illustrates a flow diagram of a method according to an example.

The blocks illustrated in the FIG. 2 may represent steps in a method and/or sections of code in the computer program 24. The illustration of a particular order to the blocks does not necessarily imply that there is a required or preferred order for the blocks and the order and arrangement of the block may be varied. Furthermore, it may be possible for some blocks to be omitted.

Although examples of the present invention have been described in the preceding paragraphs, it should be appreciated that modifications to the examples given can be made without departing from the scope of the invention as claimed. For example, the method illustrated in FIG. 2 may not include blocks 58 and 62 (that is, no global block matching may be performed) and consequently, the reference image is the same as the first image in these examples.

Features described in the preceding description may be used in combinations other than the combinations explicitly described.

Although functions have been described with reference to certain features, those functions may be performable by other features whether described or not.

Although features have been described with reference to certain examples, those features may also be present in other examples whether described or not.

Whilst endeavoring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A method implemented by a printer apparatus to generate an image, the method comprising:
   determining, by the printer apparatus, a plurality of offset vectors for portions of a first image by comparing the similarity of the portions to portions of a second image;
   determining, by the printer apparatus, the validity of a first offset vector of the plurality of offset vectors by comparing the first offset vector with other offset vectors of the plurality of offset vectors;
   changing, by the printer apparatus, the first offset vector where the first offset vector is determined as invalid; and
   generating, by the printer apparatus, an image by applying the plurality of offset vectors to the portions of the first image.

2. A method as claimed in claim 1, wherein determining the plurality of offset vectors includes: calculating a similarity parameter for a plurality of positions of a portion of the first image relative to the second image; and selecting the position where the portion of the first image has greatest similarity to the second image.

3. A method as claimed in claim 2, wherein determining a plurality of offset vectors includes: plotting a graph of the similarity parameter versus position of the portion of the first image; and selecting the position on the graph where the portion of the first image has greatest similarity to the second image.

4. A method as claimed in claim 2, wherein at least a portion of the plurality of positions has a predetermined pattern.

5. A method as claimed in claim 4, wherein at least one position of the plurality of positions corresponds to the determined offset vector of an adjacent portion of the first image, the at least one position being separate to the predetermined pattern.

6. A method as claimed in claim 4, wherein the predetermined pattern is a rood pattern.

7. A method as claimed in claim 1, wherein determining the validity of the first offset vector includes: determining whether the first offset vector lies within a predetermined range of offset vectors.

8. A method as claimed in claim 7, wherein the predetermined range of offset vectors is determined from the offset vectors of portions adjacent to the portion associated with the first offset vector.

9. A method as claimed in claim 7, wherein the predetermined range of offset vectors is determined from the offset vectors of portions in the same row or column as the portion associated with the first offset vector.

10. A method as claimed in claim 1, further comprising: determining an offset vector for a reference image by comparing the similarity of the reference image to the second image; and generating the first image by applying the offset vector to the reference image.

11. A method as claimed in claim 1, wherein the second image is a scanned image of printed media, and the method further comprises identifying printing defects by comparing the similarity of the second image with the generated image.

12. An apparatus to generate an image, the apparatus comprising a controller to:
   determine a plurality of offset vectors for portions of a first image by comparing the similarity of the portions to portions of a second image;
   determine the validity of a first offset vector of the plurality of offset vectors by comparing the first offset vector with other offset vectors of the plurality of offset vectors;
   change the first offset vector where the first offset vector is determined as invalid; and
   generate an image by applying the plurality of offset vectors to the portions of the first image.

13. An apparatus as claimed in claim 12, wherein the controller is arranged to determine the plurality of offset vectors by calculating a similarity parameter for a plurality of positions of a portion of the first image relative to the second image and selecting the position where the portion of the first image has greatest similarity to the second image.

14. An apparatus as claimed in claim 13, wherein the controller is arranged to determine the plurality of offset vectors by plotting a graph of the similarity parameter versus position of the portion of the first image and selecting the position on the graph where the portion of the first image has greatest similarity to the second image.

15. An apparatus as claimed in claim 13, wherein at least a portion of the plurality of positions has a predetermined pattern.

16. An apparatus as claimed in claim 15, wherein at least one position of the plurality of positions corresponds to the determined offset vector of an adjacent portion of the first image, the at least one position being separate to the predetermined pattern.

17. An apparatus as claimed in claim 12, wherein the controller is arranged to determine the validity of the first offset vector by determining whether the first offset vector lies within a predetermined range of offset vectors.

18. An apparatus as claimed in claim 12, wherein the controller is arranged to determine an offset vector for a reference image by comparing the similarity of the reference image to the second image; and generating the first image by applying the offset vector to the reference image.

19. Printer apparatus comprising:
   a printer to print on media;
   a scanner to generate a scanned image of the printed media;
   a controller to determine a plurality of offset vectors for portions of a first image by comparing the similarity of the portions to the scanned image; determine the validity of a first offset vector of the plurality of offset vectors by comparing the first offset vector with other offset vectors of the plurality of offset vectors; change the first offset vector where the first offset vector is determined as invalid; generate an image by applying the plurality of offset vectors to the portions of the first image; and identify printing defects on the printed media by comparing the similarity of the scanned image with the generated image.

20. Printer apparatus as claimed in claim 19, further comprising an alarm to indicate that a printing defect has been detected on the printed media.

* * * * *